(12) United States Patent
Shore et al.

(10) Patent No.: US 7,864,681 B2
(45) Date of Patent: Jan. 4, 2011

(54) METHOD AND SYSTEM FOR A GIGABIT ETHERNET IP TELEPHONE CHIP WITH 802.1P AND 802.1Q QUALITY OF SERVICE (QOS) FUNCTIONALITIES

(75) Inventors: Paul Shore, Whistler (CA); Balwinder Boora, Surrey (CA); Henry Li, Vancouver (CA); Stephen Mueller, Foothill Ranch, CA (US)

(73) Assignee: Broadcom Corp.

( * ) Notice: Subject to any disclaimer, the term of this patent is extended or adjusted under 35 U.S.C. 154(b) by 1128 days.

(21) Appl. No.: 11/151,135

(22) Filed: Jun. 13, 2005

(65) Prior Publication Data

US 2006/0023697 A1 Feb. 2, 2006

Related U.S. Application Data

(60) Provisional application No. 60/588,783, filed on Jul. 15, 2004.

(51) Int. Cl.
*G01R 31/08* (2006.01)
*H04L 12/66* (2006.01)

(52) U.S. Cl. ...................................... 370/235; 370/352
(58) Field of Classification Search ........................ None
See application file for complete search history.

(56) References Cited

U.S. PATENT DOCUMENTS

| | | | | |
|---|---|---|---|---|
| 6,944,678 B2* | 9/2005 | Lu et al. | ...................... | 709/245 |
| 7,039,712 B2* | 5/2006 | Valavi et al. | ................. | 709/228 |
| 7,212,534 B2* | 5/2007 | Kadambi et al. | ......... | 370/395.2 |
| 7,274,684 B2* | 9/2007 | Young et al. | ................. | 370/352 |
| 2001/0043603 A1* | 11/2001 | Yu | ............................... | 370/393 |
| 2002/0018489 A1* | 2/2002 | Ambe et al. | ................. | 370/475 |
| 2002/0042836 A1* | 4/2002 | Mallory | ....................... | 709/232 |
| 2002/0169844 A1* | 11/2002 | Jammes et al. | .............. | 709/207 |
| 2002/0186705 A1* | 12/2002 | Kadambi et al. | ............ | 370/452 |
| 2002/0196796 A1* | 12/2002 | Ambe et al. | ................. | 370/401 |
| 2003/0091042 A1* | 5/2003 | Lor | ............................ | 370/389 |
| 2003/0126286 A1* | 7/2003 | Lee | ............................. | 709/238 |
| 2003/0233580 A1* | 12/2003 | Keeler et al. | ................. | 713/201 |
| 2003/0236901 A1* | 12/2003 | Barazesh et al. | ............ | 709/230 |
| 2004/0090995 A1* | 5/2004 | Kang et al. | .................. | 370/535 |
| 2004/0091089 A1* | 5/2004 | Wynn | ....................... | 379/93.05 |
| 2005/0138582 A1* | 6/2005 | So et al. | ......................... | 716/4 |
| 2005/0220105 A1* | 10/2005 | Yen et al. | ..................... | 370/392 |
| 2006/0050681 A1* | 3/2006 | Monteiro et al. | ............ | 370/352 |
| 2006/0156357 A1* | 7/2006 | Lockridge et al. | ............. | 725/90 |

* cited by examiner

*Primary Examiner*—Hong Cho
*Assistant Examiner*—Eunsook Choi
(74) *Attorney, Agent, or Firm*—McAndrews, Held & Malloy, Ltd.

(57) ABSTRACT

Methods and systems for processing data are disclosed herein and may comprise receiving packetized data via at least one input port in an 802.1p and 802.1Q QoS compliant Ethernet switch integrated within a single gigabit Ethernet IP telephone chip that processes multiple voice channels. A priority class may be assigned by the 802.1p and 802.1Q compliant QoS Ethernet switch to at least a portion of the received packetized data. The received packetized data may be processed by the 802.1p and 802.1Q QoS compliant Ethernet switch based on the assigned priority class. The priority class may comprise a high priority class and/or a low priority class. If the priority class comprises a high priority class, the portion of the received packetized data may be buffered in a high priority buffer integrated within the 802.1p and 802.1Q QoS compliant Ethernet switch.

34 Claims, 6 Drawing Sheets

METHOD AND SYSTEM FOR A GIGABIT ETHERNET IP TELEPHONE CHIP WITH 802.1P AND 802.1Q QUALITY OF SERVICE (QOS) FUNCTIONALITIES

CROSS-REFERENCE TO RELATED APPLICATIONS/INCORPORATION BY REFERENCE

This application makes reference to, claims priority to, and claims the benefit of U.S. Provisional Application Ser. No. 60/588,783 filed Jul. 15, 2004 and entitled "Method and System for a Gigabit Ethernet IP Telephone Chip."

This application makes reference to:
U.S. application Ser. No. 11/151,138 filed Jun. 13, 2005;
U.S. application Ser. No. 11/151,388 filed Jun. 13, 2005;
U.S. application Ser. No. 11/151,614 filed Jun. 13, 2005; and
U.S. application Ser. No. 11/151,139 filed Jun. 13, 2005.

The above stated applications are hereby incorporated herein by reference in their entirety.

FIELD OF THE INVENTION

Certain embodiments of the invention relate generally to IP telephones. More specifically, certain embodiments of the invention relate to a method and system for a gigabit Ethernet IP telephone chip with 802.1p and 802.1Q quality of service (QoS) functionalities.

BACKGROUND OF THE INVENTION

High-speed digital communication networks over copper and optical fiber are used in many network communication and digital storage applications. Ethernet and Fiber Channel are two widely used communication protocols, which continue to evolve in response to increasing demands for higher bandwidth in digital communication systems.

The Ethernet protocol may provide collision detection and carrier sensing in the physical layer. The physical layer, layer 1, is responsible for handling all electrical, optical, opto-electrical and mechanical requirements for interfacing to the communication media. Notably, the physical layer may facilitate the transfer of electrical signals representing an information bitstream. The physical layer (PHY) may also provide services such as, encoding, decoding, synchronization, clock data recovery, and transmission and reception of bit streams.

As the demand for higher data rates and bandwidth continues to increase, equipment vendors are continuously being forced to employ new design techniques for manufacturing network equipment capable of handling these increased data rates. In response to this demand, the physical layer, or PHY, has been designed to operate at gigabit speeds to keep pace with this demand for higher data rates. These gigabit PHYs are now becoming quite popular in home and office use.

Gigabit Ethernet, which initially found application in gigabit servers, is becoming widespread in personal computers, laptops, and switches, thereby providing the necessary infrastructure for handling data traffic of PCs and packetized telephones. However, network switches, which may be located in a central location within an office, run multiple cable mediums for network and voice data from the switch location to individual office locations, for example. In this regard, multiple cable mediums are now utilized to carry voice and network data. In the alternative, a single cable medium for voice and network data may run from the network switch to individual office locations. However, this scenario is costly as each office location will require a separate switch to route voice data to a telephone and network data to a PC.

Furthermore, existing 10/100Base Ethernet IP telephones place a bottleneck on the gigabit path between gigabit Ethernet enabled PCs and gigabit Ethernet wiring switches, since the Ethernet IP telephone is not adapted to process data utilizing gigabit speeds. Data may be communicated in gigabit speeds from a gigabit Ethernet switch to the Ethernet IP telephone, but the Ethernet IP telephone may only handle data at speeds lower than one gigabit. In this regard, existing telephones may only process gigabit Ethernet data speeds with an external gigabit Ethernet transceiver which increases connection complexity.

In certain applications, factors such as network traffic prioritization and secure handling of information may play a significant role in the design of a gigabit Ethernet IP telephone and components integrated therein. For example, a gigabit Ethernet IP telephone may be adapted to receive multiple types of data, which may have to be prioritized for efficient processing. Some gigabit Ethernet IP telephones handle voice data, and users expect voice quality on par with that of circuit switched plain old telephone service (POTS) telephones. This places certain demands and constraints on the handling of voice data with regard to latency. Furthermore, some network data may have to be communicated and processed in a secure manner within the gigabit Ethernet IP telephone.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a gigabit Ethernet IP telephone chip with 802.1p and 802.1Q quality of service (QoS) functionalities, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a gigabit Ethernet IP telephone chip with integrated 802.1p and 802.1Q quality of service (QoS). In accordance with an embodiment of the invention, a gigabit Ethernet IP telephone chip, which comprises integrated 802.1p and 802.1Q QoS functionalities, may be adapted to prioritize one or more types of data received via a network connection. For example, the gigabit Ethernet IP telephone chip may utilize a multiport Ethernet switch with integrated 802.1p priority processing capabilities.

In accordance with an embodiment of the invention, an 802.1p compliant QoS scheme may be implemented within the multiport gigabit Ethernet switch utilizing a priority queue, for example. In this regard, priority classes may be assigned to data received via one or more input ports of the multiport gigabit Ethernet switch with integrated 802.1p and 802.1Q QoS functionalities. More specifically, received data may comprise one or more user priority indicator, which may be mapped to a priority class. For example, a user priority indicator for received data may be within the range of 0-7 and may be mapped to one of two data priority classes—0 for low priority and 1 for high priority, for example. The multiport Ethernet switch with integrated 802.1p and 802.1Q QoS functionalities may also be adapted to switch, or modify, one or more existing user priority indicators after data is received by the multiport Ethernet switch. In another embodiment of the invention, the multiport Ethernet switch with integrated 802.1p and 802.1Q QoS functionalities may utilize 802.1Q virtual LAN (VLAN) functionalities for partitioning one or more switching ports into private domains. In this regard, at least a portion of data handled by the gigabit Ethernet IP telephone chip may be communicated and switched via selected private domains. This increases security of data processing within the gigabit Ethernet IP telephone chip with integrated 802.1p and 802.1Q QoS functionalities.

Figure 1A:
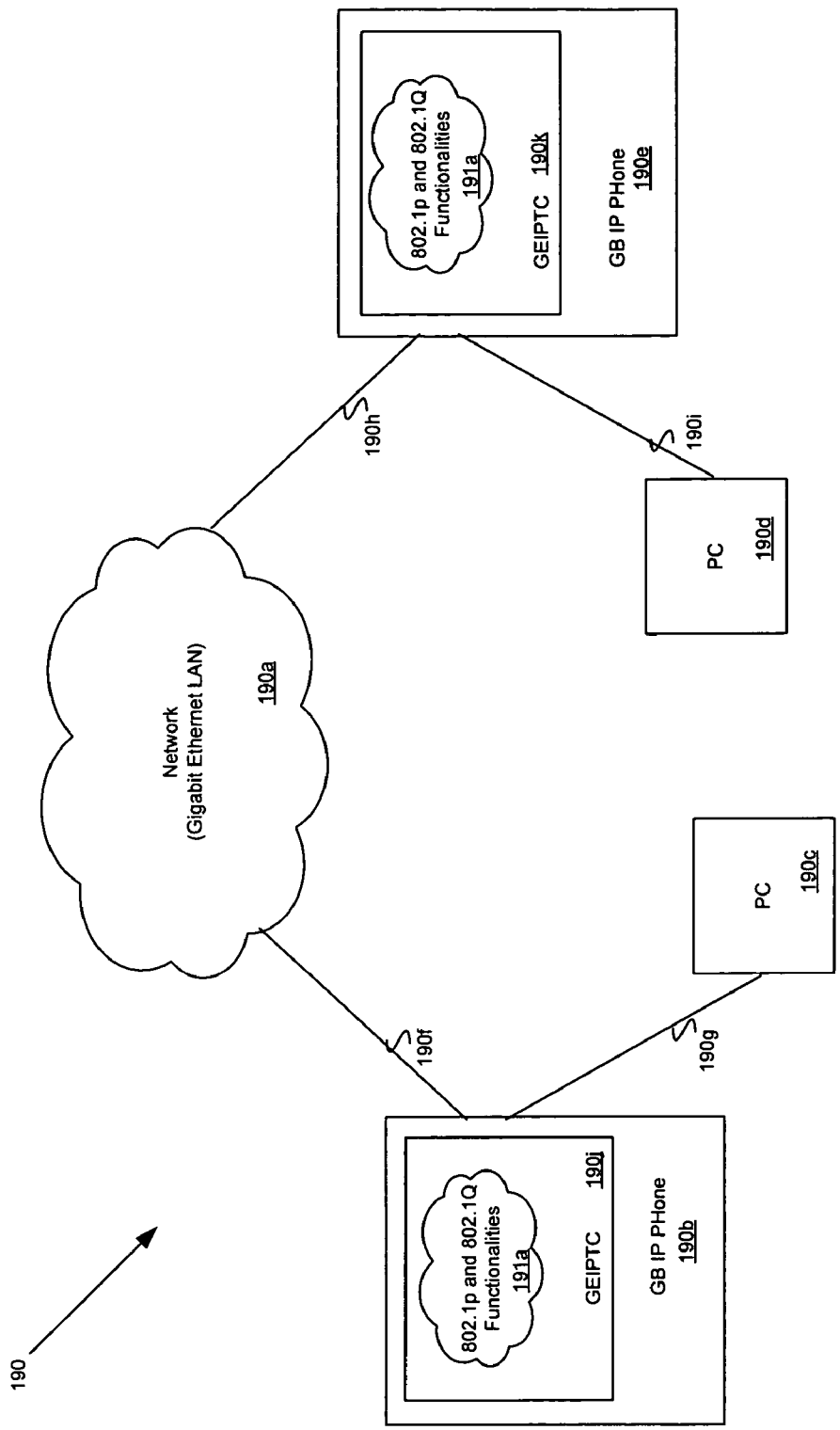
FIG. 1A is an exemplary system comprising gigabit IP telephones with integrated 802.1p and 802.1Q QoS functionalities coupled to a network, in accordance with an embodiment of the invention.

FIG. 1A is an exemplary system comprising gigabit IP telephones with integrated 802.1p and 802.1Q QoS functionalities coupled to a network, in accordance with an embodiment of the invention. Referring to FIG. 1A, the network telephone system 190 may comprise gigabit IP telephones 190b and 190e, personal computers (PCs) 190c and 190d, and an network 190a. The PCs 190c and 190d may be gigabit Ethernet enabled PCs. The network may comprise gigabit Ethernet local area network (LAN). The gigabit IP telephones 190b and 190e may each comprise an integrated gigabit Ethernet IP telephone chip (GEIPTC) 190j and 190k, with integrated 802.1p and 802.1Q QoS functionalities 191a. The GEIPTC 190j and 190k with integrated 802.1p and 802.1Q QoS functionalities 191a may comprise suitable circuitry, logic, and/or code and may be adapted to support connection between the gigabit IP telephones 190b and 190e, the network 190a, and the PCs 190c and 190d, respectively. Furthermore, the GEIPTC 190j and 190k with integrated 802.1p and 802.1Q QoS functionalities 191a may be adapted to utilize one or more priority buffers for prioritizing received data or data prior to communication outside the gigabit IP telephones 190b and 190e. The GEIPTC 190j and 190k with integrated 802.1p and 802.1Q QoS functionalities 191a may also utilize a gigabit Ethernet multiport switch with 802.1Q VLAN functionalities for partitioning one or more switching ports into a plurality of private domains for increased data security.

In this regard, a single gigabit Ethernet cable medium 190f may connect the network 190a and the gigabit IP telephone 190b and a single, gigabit Ethernet medium cable 190g may connect the gigabit IP telephone 190b with the gigabit enabled PC 190c. Similarly, a single gigabit Ethernet cable medium 190h may connect the network 190a and the gigabit IP telephone 190e and a single gigabit Ethernet medium cable 190i may connect the gigabit IP telephone 190e with the gigabit enabled PC 190d.

In operation, voice data may be communicated between gigabit IP telephones 190e and 190b, via Ethernet cable mediums 190h, 190f, and the network 190a. The network 190a may also communicate network data to the gigabit Ethernet enabled PCs 190c and 190d, via Ethernet cable mediums 190f, 190g, 190h, and 190i. In this regard, Ethernet cable mediums 190f and 190h may communicate network data, originating from the network 190a, and voice data, originating from either telephone 190b or telephone 190e. After gigabit IP telephones 190b and 190e receive voice and network data via Ethernet cable mediums 190f and 190h, the GEIPTC 190j and 190k integrated within gigabit IP telephones 190b and 190h may switch the voice data for processing within the telephones 190b and 190h. Furthermore, the GEIPTC 190j and 190k may switch the network data to the PCs 190c and 190d via Ethernet cable mediums 190g and 190i, respectively. The GEIPTC with integrated 802.1p and 802.1Q QoS functionalities 190j and 190k may prioritize the voice and/or network data utilizing one or more low and high priority buffers. The GEIPTC 190j and 190k with integrated 802.1p and 802.1Q QoS functionalities 191a may also utilize 802.1Q VLAN partitioning of switching ports into one or more private domains for securely handling of data within the gigabit IP telephones 190b and 190e.

Figure 1B:
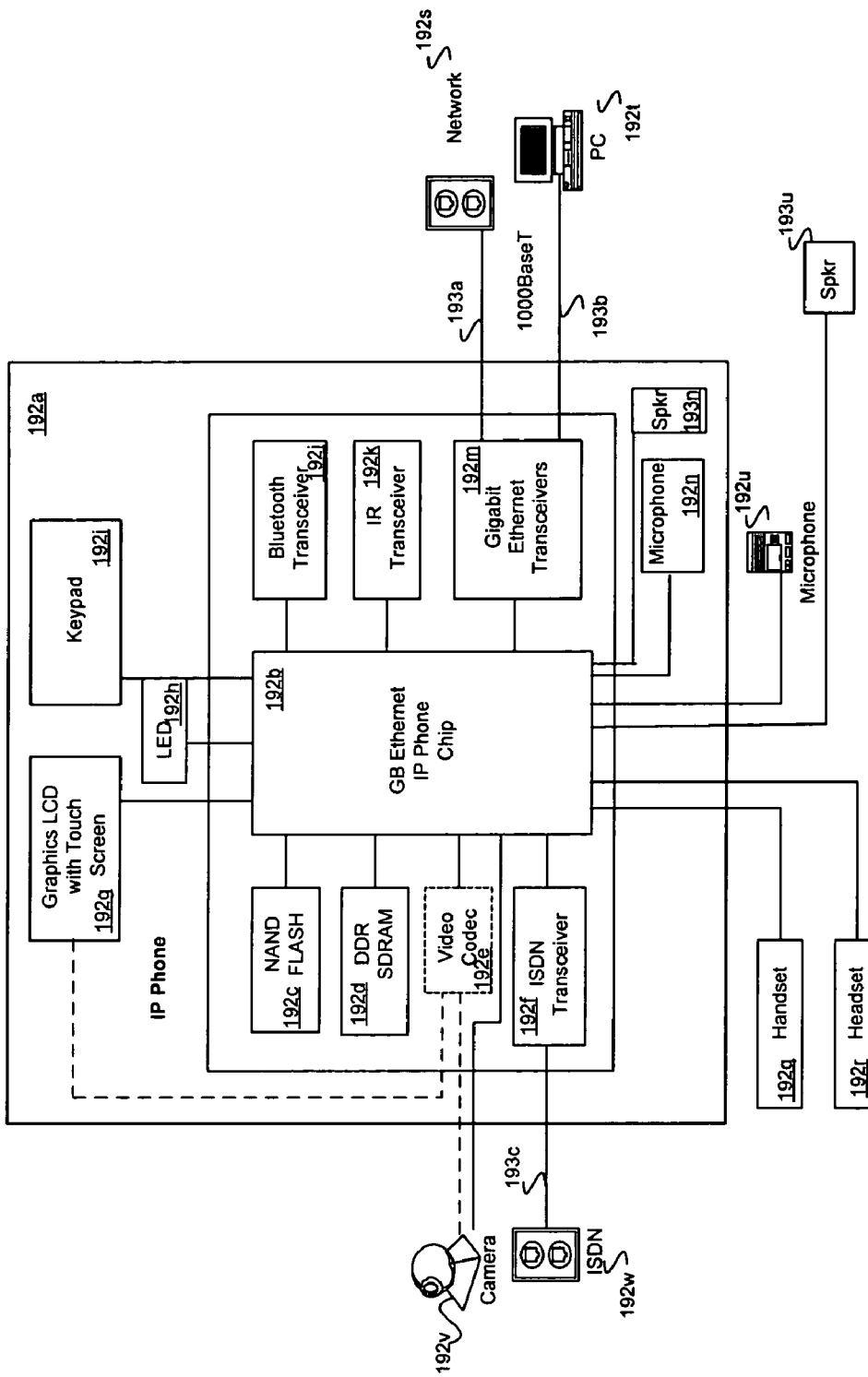
FIG. 1B is a block diagram of an exemplary gigabit Ethernet IP telephone comprising a single integrated gigabit Ethernet IP telephone chip with integrated 802.1p and 802.1Q QoS functionalities, in accordance with an embodiment of the invention.

FIG. 1B is a block diagram of an exemplary gigabit Ethernet IP telephone comprising a single integrated gigabit Ethernet IP telephone chip with integrated 802.1p and 802.1Q QoS functionalities, in accordance with an embodiment of the invention. Referring to FIG. 1B, the exemplary gigabit Ethernet IP telephone 192a may comprise a gigabit Ethernet IP telephone chip 192b, a LED 192h, keypad 192i, graphics LCD with touch screen capabilities 192g, NAND Flash memory 192c, double data rate synchronous dynamic random access memory (DDR SDRAM) 192d, an integrated services digital network (ISDN) transceiver 192f, internal microphone 192n, internal speaker 193n, a gigabit Ethernet transceiver (PHY) 192m, an IR transceiver 192k, and a Bluetooth® transceiver 192j.

The gigabit Ethernet IP telephone chip 192b with integrated 802.1p and 802.1Q QoS functionalities may utilize 802.1p priority and 802.1Q VLAN functionalities, for example. In this regard, the gigabit Ethernet IP telephone chip 192b with integrated 802.1p and 802.1Q QoS functionalities may be adapted to prioritize one or more types of data received by the gigabit Ethernet IP telephone 192a. Received data may comprise a user priority indicator, which may be mapped to a low priority or a high priority class, for example. User priority indicators, such as 0-7, for example, may be mapped to the received data by system software. Data mapped to a low priority class may be queued in a low priority queue and data mapped to a high priority class may be queued in a high priority queue. Mapping of the user priority indicators to the priority classes may be changed to alter the prioritization.

Furthermore, the gigabit Ethernet IP telephone chip 192b with integrated 802.1p and 802.1Q QoS functionalities may utilize a gigabit Ethernet multiport switch with 802.1Q virtual LAN (VLAN) functionalities for partitioning one or more switching ports into private domains. Received or outgoing data within the gigabit Ethernet IP telephone 192a may then be communicated via corresponding private domains of one or more switching ports within the gigabit Ethernet IP telephone chip 192b.

In one embodiment of the invention, the gigabit Ethernet IP telephone 192a may comprise a video codec block 192e, which may be optional.

In another embodiment of the invention, the gigabit Ethernet IP telephone chip 192b may be adapted to acquire and process voice data from one or more off-chip devices coupled to the gigabit Ethernet IP telephone 192a. For example, voice data may be communicated to the gigabit Ethernet IP telephone 192a from a network, such as a gigabit Ethernet LAN 192s via the Ethernet cable medium 193a and off-chip gigabit Ethernet transceiver (PHY) 192m, or from an ISDN 192w via cable medium 193c and an ISDN transceiver 192f. Voice data may be also communicated to the gigabit Ethernet IP telephone 192a via handset 192g, headset 192r, external speaker 193u, or internal speaker 193n.

In another embodiment of the invention, the gigabit Ethernet IP telephone chip 192b may be adapted to acquire and process network data from one or more off-chip devices coupled to the gigabit Ethernet IP telephone 192a. For example, network data may be received by the gigabit Ethernet IP telephone chip 192b from the network 192s via the Ethernet cable medium 193a and the gigabit PHY 192m. The gigabit Ethernet IP telephone chip 192b may utilize video codec 192e to decode received video data. Furthermore, video data may be communicated to the gigabit Ethernet IP telephone chip 102b for processing from an external camera 192v coupled to the video codec 192e. Processed data, which may comprise voice and/or video data, may be stored by the gigabit Ethernet IP telephone chip 192b in off-chip memory, such as NAND flash memory 192c and/or DDR SDRAM 192d. Video data may be also displayed by the LCD screen 192g. In one embodiment of the invention, the video codec 192e may be utilized for encoding as well as for providing video conferencing capabilities to the gigabit Ethernet IP telephone 192a. If the gigabit Ethernet IP telephone 192a comprises a video codec 192e, the camera 192v and the LCD 192g may be coupled to the video codec 192e. If the gigabit Ethernet IP telephone 192a does not comprise a video codes 192e, the camera 192v and the LCD 192g may be coupled to the gigabit Ethernet IP telephone chip 192b.

The gigabit Ethernet IP telephone chip 192b may comprise suitable circuitry, logic, and/or code and may be adapted to prioritize and switch voice and/or network data for processing within the gigabit Ethernet IP telephone 192a or outside the telephone 192a. For example, voice data may be communicated to the gigabit Ethernet IP telephone chip 192b from the ISDN 192w via the cable medium 193c and the off-chip ISDN transceiver 192f. Network data may be communicated to the gigabit Ethernet IP telephone chip 192b from the network 192s via the Ethernet cable medium 193b and the off-chip gigabit PHY 192m. The gigabit Ethernet IP telephone chip 192b may be adapted to prioritize the voice and/or network data utilizing 802.1p priority tagging of data and one or more low and high priority buffers. Received data may comprise a user priority indicator, which may be mapped to a low priority or a high priority class, for example. Data mapped to a low priority class may be queued in a low priority queue and data mapped to a high priority class may be queued in a high priority queue. Mapping of the user priority indicators to the priority classes may be changed to alter the prioritization. The gigabit Ethernet IP telephone chip 192b may also utilize 802.1Q VLAN partitioning of switching ports into one or more private domains for securely handling of data within the gigabit IP telephone 192a.

The gigabit Ethernet IP telephone chip 192b integrated within the gigabit IP telephone 192a may then switch the voice data for processing within the telephone 192a. The network data may be switched to the PC 192t via the off-chip gigabit Ethernet PHY 192m and the Ethernet cable medium 193b. Other data switching scenarios for switching voice and/or network data by the gigabit Ethernet IP telephone chip 192b may also be possible utilizing one or more peripheral device coupled to the gigabit IP telephone 192a, as illustrated in FIG. 1B.

Figure 1C:
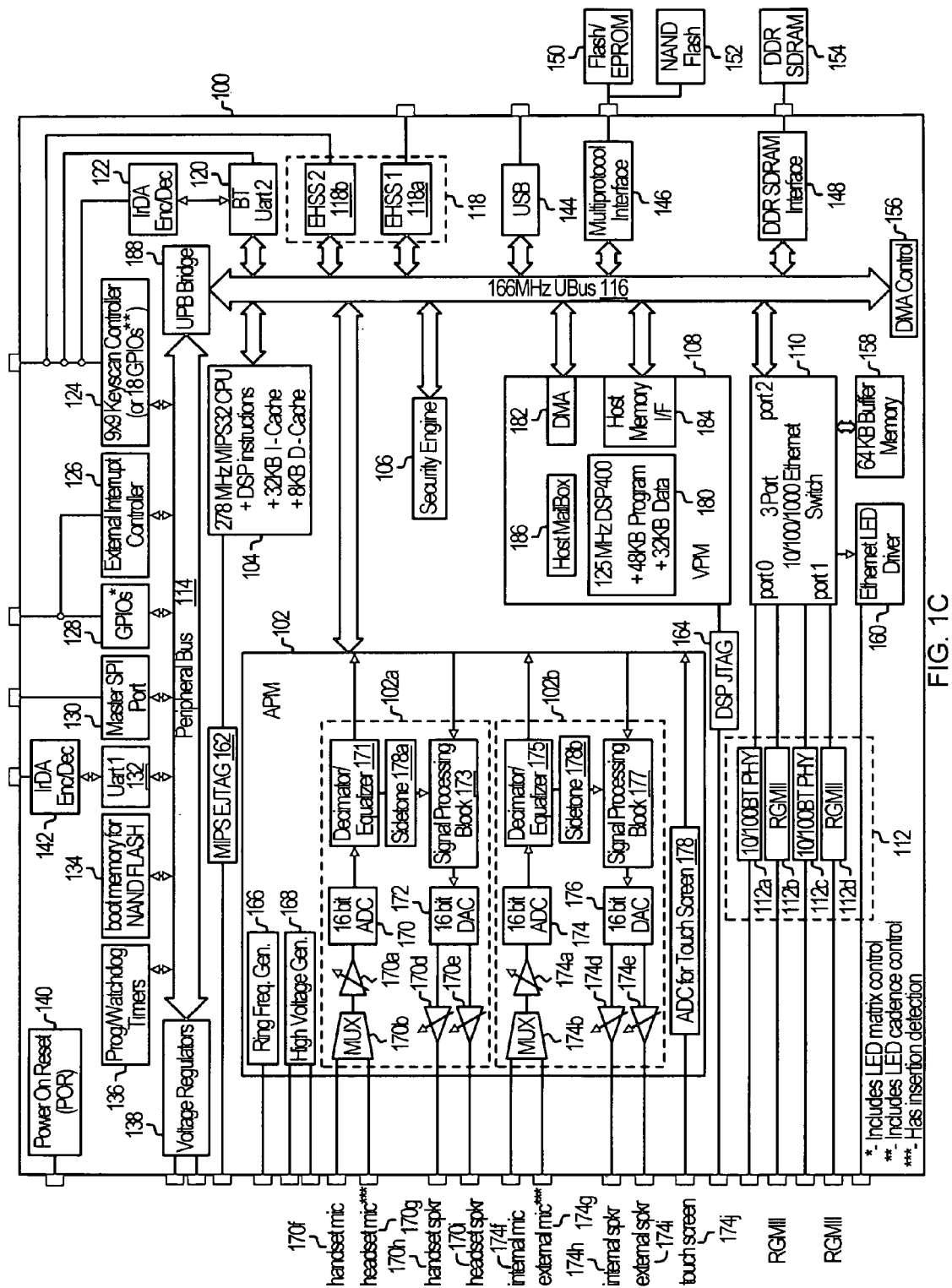
FIG. 1C is a block diagram of an exemplary system for a gigabit Ethernet IP telephone chip having an integrated Ethernet switch with 802.1p and 802.1Q QoS functionalities, in accordance with an embodiment of the invention.

FIG. 1C is a block diagram of an exemplary system for a gigabit Ethernet IP telephone chip having an integrated Ethernet switch with 802.1p and 802.1Q QoS functionalities, in accordance with an embodiment of the invention. Referring to FIG. 1C, the chip 100 may comprise a dual CODEC block 102, a core processor 104, security engine 106, voice processing module (VPM) 108, a multiport Ethernet switch with 802.1p and 802.1Q QoS functionalities 110, PHY/RGMII interfaces block 112, peripheral bus 114, system bus 116, power on reset (POR) block 140, voltage regulators block 138, DMA controller block 156, memory block 158, Ethernet LED interface 160, Joint Test Action Group (JTAG) ports 162, 164, a plurality of system interfaces, and a plurality of peripheral interfaces.

The system interfaces may comprise a Bluetooth interface 120, an Infrared Data Association (IrDA) encoder/decoder block 122, an enhanced high-speed serial (EHSS) port block 118, a universal serial bus (USB) interface block 144, multiprotocol interface block 146, and a memory interface 148. Communication with the system interfaces may occur via the system bus 116. The peripheral interfaces may comprise a keyscan controller block 124, an external interrupt controller block 126, a general purpose input/output (GPIO) block 128, a master serial peripheral interface (SPI) port block 130, a universal asynchronous receiver/transmitter (UART) block 132, an Infrared Data Association (IrDA) encoder/decoder block 142, boot memory block for NAND flash 134, and programmable/watchdog timers block 136. Communication with the peripheral interfaces may occur via the peripheral bus 114. The peripheral bus 114 and the system bus 116 may be coupled via a universal bus to peripheral bus bridge (UPB) 188.

The dual CODEC block 102, the core processor 104, the security engine 106, the voice processing module (VPM) 108, the multiport Ethernet switch with 802.1p and 802.1Q QoS functionalities 110, the DMA controller block 156, the Bluetooth interface 120, the enhanced high-speed serial (EHSS) port block 118, the universal serial bus (USB) interface block 144, the multiprotocol interface block 146, and the DDR SDRAM memory interface 148 may be coupled via the system bus 116. The keyscan controller block 124, the external interrupt controller block 126, the general purpose input/output (GPIO) block 128, the master serial peripheral interface (SPI) port block 130, the universal asynchronous receiver/transmitter (UART) block 132, the Infrared Data Association (IrDA) encoder/decoder block 142, the boot memory block for NAND flash 134, and the programmable/watchdog timers block 136 may be coupled via the peripheral bus 114. Furthermore, the PHY/RGMII interfaces block 112, the memory block 158, and the Ethernet LED interface 160 may be coupled to the multiport Ethernet switch with 802.1p and 802.1Q QoS functionalities 110.

The dual CODEC block 102 comprises suitable coder/decoder (CODEC) logic, circuitry and/or code that may be adapted to handle compression/decompression of audio signals, such as conversion between analog signals and digital samples at various sample rates. For example, the dual CODEC block 102 may comprise a ring frequency generator block 166, a high voltage generator block 168, CODEC blocks 102a and 102b. The CODEC block 102a may comprise a decimator/equalizer block 171, a sidetone generator block 178a, a signal processing block 173, an interpolating CIC filter 173, an ADC block 170, a digital-to-analog converter (DAC) block 172, a multiplexer 170b, and gain controllers (amplifiers) 170a, 170d and 170e. Similarly, the CODEC block 102b may comprise a decimator/equalizer block 175, a sidetone generator block 178b, a signal processing block 177, an ADC block 174, a digital-to-analog converter (DAC) block 176, a multiplexer 174b, and gain controllers (amplifiers) 174a, 174d and 174e. The decimator/equalizer blocks 171 and 173 may comprise one or more decimating cascaded integrator comb (CIC) filters and/or one or more equalizers. The CIC filters may be adapted to perform resampling from 12.5 MHz, for example, which may be the raw sampling rate of the ADCs 170 and 174 and the DACs 172 and 176.

Also integrated within chip 100 is an ADC 178 that may be adapted to handle touch screen capability. Although the ADC 178 is illustrated as being internal to the dual CODEC block 102, the invention is not so limited. Accordingly, in another embodiment of the invention, the ADC 178 may be located externally to the dual CODEC block 102. The sidetone generator blocks 178a and 178b may comprise one or more Y-filters and may allow sidetone to be added to a receive path of an audio signal.

The CODEC block 102a may be adapted to support a plurality of input and a plurality of output audio sources by way of multiplexing. For example, audio input from a handset microphone 170f and a headset microphone 170g may be multiplexed by the multiplexer 170b and may be utilized as audio inputs to the CODEC block 102a. Audio output signals from the CODEC block 102a may be amplified by amplifiers 170d and 170e before being communicated to a handset speaker 170h and a headset speaker 170i, respectively.

Similarly, the CODEC block 102b may be adapted to support a plurality of input and a plurality of output audio sources by way of multiplexing. For example, audio input from an internal microphone 174f and an external microphone 174g may be multiplexed by the multiplexer 174b and may be utilized as audio inputs to the CODEC block 102b. Audio output signals from the CODEC block 102b may be amplified by amplifiers 174d and 174e before being communicated to an internal speaker 174h and an external speaker 174i, respectively. The ADC 178 may be adapted to convert analog signals received from the touch screen enabled monitor 174j.

The ring frequency generator 166 may comprise suitable circuitry, logic, and/or code and may be adapted to generate a ringing reference waveform. The generated ringing reference waveform may be utilized by one or more serial link and interrupt controllers (SLICs), integrated within the gigabit Ethernet IP telephone chip 100, to drive their high voltage ringing circuitry. The waveform generated by the ring frequency generator 166 may be configurable between sinusoids, trapezoids, and square waves. Frequency, amplitude, and DC offset may also be configurable. In one embodiment of the invention, the ring frequency generator 166 may comprise power down control circuitry.

The high voltage generator 168 may comprise suitable circuitry, logic, and/or code and may be adapted to generate voltages required by an external SLIC, for example, for ringing and battery feed. In one aspect of the invention, the high voltage generator 168 may be adapted to generate a plurality of negative supply voltages, such as −70 and −21 V nominally, which may be required for SLIC operation.

The core processor 104 may be, for example, a reduced instruction set computer (RISC) processor, such as a million-instructions-per-second (MIPS) processor. The core processor 104 may also comprise suitable logic, circuitry and/or code that may be adapted to handle digital signal processing (DSP) instructions. In an embodiment of the invention, the ability to handle DSP instructions by the core processor 104 may be enabled or disabled. Accordingly, the core processor 104 may be operated with the DSP instruction capability disabled. In one aspect of the invention, the ability to handle DSP instructions by the core processor 104 may be disabled when the voice processing module 108 is utilized. A Joint Test Action Group (JTAG) emulator (EJTAG) port 162 may be coupled to the processor core 162 and may be utilized for debugging. The core processor 104 may be a RISC processor that may be utilized to run operating system code and customer application code, for example. Customer application code may include messaging code, call processing code and web browser code, for example.

The security engine 106 may comprise suitable logic, circuitry, and/or code that may be adapted to handle security functions, such as encryption, decryption and/or authentication. The security engine 106 may comprise a hardware based security module (HSM), not shown in FIG. 1C, which may provide a hardware-ensured secure way to digitally identify a device based on cryptographic algorithms. Secure digital identification within the HSM may be achieved by, for example, embedding the identity or private key information in protected on-chip one-time programmable (OTP) ROM. Private key information may then be used to secure voice and/or data traffic within the gigabit Ethernet IP telephone chip 100. The HSM may also comprise assurance logic, which may be utilized to prevent device tampering and unwanted access to secure information in ROM. A gigabit Ethernet IP telephone chip with integrated security module is described in U.S. application Ser. No. 11/151,614 filed Jun. 13, 2005, which is incorporated herein by reference in its entirety.

The voice processing module (VPM) 108 may comprise digital signal processor (DSP) block 180, a host mailbox block 186, a direct memory access (DMA) block 182, and a host memory interface block 184. The DSP block 180 may comprise memory that may be adapted to handle storage of data and storage of program code. A JTAG port 164 coupled to the VPM 108 may be utilized for debugging. The DSP block 180 may be adapted to run voice processing application code and CODEC algorithms for one or more of a plurality of protocols or standards.

The VPM 108 may be adapted to perform voice related signal processing functions within the gigabit Ethernet IP telephone chip 100. The DMA block 182 may be utilized to transport CODEC data and/or program code between internal memory of the VPM 108 and external memory, such as dynamic random access memory (DRAM) for example, for processing. In one embodiment of the invention, the DMA block 182 may comprise a dual channel DMA engine. Voice data may be also stored in off-chip memory, such as DDR-SDRAM 154 via the DDR-SDRAM interface 148.

The host mailbox block 186 may comprise a set of mailbox registers, which may be utilized to provide communication between the core processor 104 and the. DSP block 180. For example, the mailbox registers of the host mailbox block 186 may utilize an interrupt mechanism between the core processor 104 and the DSP block 180, for handling the processing of more data. The host memory interface 184 may be utilized by the DSP block 180 to directly access messages residing in external DRAM, for example.

The PHY/RGMII interfaces block 112 may comprise reduced gigabit media independent interfaces (RGMII) 112*b* and 112*d*, and 10/100Base Ethernet physical interface transceivers (PHY) 112*a* and 112*c*. The RGMII 112*b* and 112*d* may comprise suitable circuitry, logic, and/or code and may be adapted to provide an interface between a gigabit media independent interface (GMII) of the multiport Ethernet switch with 802.1p and 802.1Q QoS functionalities 110 and an external Ethernet PHY. In one embodiment of the invention, the gigabit Ethernet IP telephone chip may utilize a gigabit PHY for receiving and transmitting of packetized data. The gigabit PHY may be implemented off-chip or may be integrated within the gigabit Ethernet IP telephone chip 100. In this regard, the RGMII 112*b* and 112*d* may provide an interface between a gigabit media independent interface (GMII) of the multiport Ethernet switch with 802.1p and 802.1Q QoS functionalities 110 and an external gigabit PHY.

The 10/100Base PHYs 112*a* and 112*c* may comprise suitable circuitry, logic, and/or code and may be adapted to perform physical layer interface functions for 100BASE-TX full-duplex or half-duplex Ethernet on Category 5 cable, and/or 10BASE-T full-duplex or half-duplex Ethernet on Category 3, 4, or 5 cabling within the gigabit Ethernet IP telephone chip 100. For example, the 10/100Base PHYs 112*a* and 112*c* may support 4B5B, MLT3, and Manchester encoding and decoding, clock and data recovery, stream cipher scrambling/descrambling. The 10/100Base PHYs 112*a* and 112*c* may also support digital adaptive equalization, line transmission, carrier sense and link integrity monitor, auto-negotiation, and management.

The multiport Ethernet switch with 802.1p and 802.1Q QoS functionalities 110 may comprise suitable circuitry, logic, and/or code and may be adapted to switch between one or more ports that route data internally within the gigabit Ethernet IP telephone chip 100 for processing and one or more other ports that route data for off-chip processing. For example, as illustrated in FIG. 1C, the multiport Ethernet switch with 802.1p and 802.1Q QoS functionalities 110, which may be a 10/100/1000 Ethernet switch, for example, may comprise a plurality of ports, port 0 and port 1, for receiving and transmitting network and/or voice data off-chip via the PHY/RGMII interfaces block 112. The multiport Ethernet switch with 802.1p and 802.1Q QoS functionalities 110 may also comprise port 2 for routing voice and/or network data internally for processing within the gigabit Ethernet IP telephone chip 100. Port 0 may be coupled to the 10/100Base PHY 112*a* and RGMII interface 112*b*. Port 1 may be coupled to a 10/100Base PHY 112*c* and RGMII interface 112*d*. Port 2 may be coupled to the system bus 116.

In one embodiment of the invention, the multiport Ethernet switch with 802.1p and 802.1Q QoS functionalities 110 may be adapted to prioritize one or more types of data received via a network connection by assigning one or more priority classes to data received via one or more input ports. Received data may comprise a user priority indicator, which may be mapped to a low priority or a high priority class, for example. User priority indicators, such as 0-7, for example, may be mapped to the received data by system software. Data mapped to a low priority class may be stored in a low priority buffer and data mapped to a high priority class may be stored in a high priority buffer. Mapping of the user priority indicators to the priority classes may be changed to alter the prioritization.

For example, a low priority class may be assigned to received data with a priority indicator of 0-3 and a high priority class may be assigned to received data with a priority indicator of 3-7, for example. The multiport Ethernet switch with integrated 802.1p and 802.1Q QoS functionalities 110 may also be adapted to switch, or change, one or more existing priority indicators after data is received by the multiport Ethernet switch 110. In another embodiment of the invention, the multiport Ethernet switch with integrated 802.1p and 802.1Q QoS functionalities 110 may utilize 802.1Q virtual LAN (VLAN) functionalities for partitioning one or more switching ports into private domains. In this regard, data received by the multiport switch 110 may only be communicated and switched via selected private domains, which increases security of data processing within the gigabit Ethernet IP telephone chip with integrated 802.1p and 802.1Q QoS functionalities 100.

The multiport Ethernet switch with 802.1p and 802.1Q QoS functionalities 110 may utilize memory 158 and an Ethernet LED interface 160. The Ethernet LED interface 160 may comprise suitable circuitry, logic, and/or code and may be utilized to provide visibility of link status, combined transmit and receive activity, duplex mode, and/or port speed for each port within the multiport Ethernet switch with 802.1p and 802.1Q QoS functionalities 110. The Ethernet LED interface 160 may also provide an indication of the load and/or status of the multiport Ethernet switch with 802.1p and 802.1Q QoS functionalities 110.

The keyscan controller block 124 may comprise suitable logic, circuitry and/or code that may be adapted to determine when a key is pressed and to identify what key or keys are depressed. In one aspect of the invention, the input and output pins of the keyscan controller block 124 may be configured as general purpose input/output (GPIO) pins. The power on reset (POR) block 140 may comprise suitable logic and/or circuitry that may be adapted to handle power up and reset scenarios. The voltage regulators block 138 may comprise suitable logic and/or circuitry that may be adapted to handle voltage/current regulation within the gigabit Ethernet IP telephone chip 100.

The multiprotocol peripheral interface (MPI) block 146 may comprise suitable logic, circuitry and/or code that may be adapted to handle a plurality of different types of memory. As illustrated in FIG. 1C, flash/EPROM block 150 and NAND flash block 152 may be coupled to the multiprotocol interface block 146. The MPI block 146 may also support other types of memory, such as NOR flash memory, as well as PCI, Mini PCI, CardBus, PCMCIA and expansion bus interface (EBI) devices. In this regard, the gigabit Ethernet IP telephone chip 100 may be adapted to support high-speed peripherals, including wireless network adaptors and/or video processors, for example.

The memory interface 148 may be, for example, a double data rate (DDR) SDRAM interface block. As illustrated in FIG. 1C, a DDR SDRAM block 154 may be externally coupled to the DDR SDRAM interface block 148. The memory interface 148 may be utilized to speedily move data on-chip and off-chip for processing. The DMA controller block 156 may be utilized to facilitate DMA transfers between the external SDRAM 154 and EBI devices coupled to the gigabit Ethernet IP telephone chip 100.

The universal serial bus (USB) interface block 144 may comprise a USB compliant serial bus, which may be, for example, USB1.1, USB2.0, or other USB compliant interface.

The external interrupt controller block 126 may comprise suitable logic, circuitry, and/or code and may be adapted to handle external interrupts. For example, one or more external events may cause the external interrupt controller 126 to generate an interrupt to the core processor 104.

The GPIO block 128 may comprise a plurality of general-purpose I/O interface pins that may be programmed as input and/or output pins of the gigabit Ethernet IP telephone chip 100. One or more registers within the gigabit Ethernet IP telephone chip 100 may be utilized to program the general-purpose I/O interface pins in the GPIO block 128. The GPIO block 128 may also comprise a LED matrix block, which may be utilized to indicate a status of the GPIO interface pins.

The master SPI port block 130 is a standardized serial peripheral interface (SPI) port and may be utilized for communication with the serial programming interfaces of various devices coupled to the gigabit Ethernet IP telephone chip 100.

The universal asynchronous receiver/transmitter (UART) block 132 may comprise a standard UART port which may be utilized as a debug port. The UART block 132 may be coupled to an Infrared Data Association (IrDA) encoder/decoder block 142 which may support serial infrared (SIR) mode of infrared communication. In this regard, the IrDA encoder/decoder block 142 may support an infrared communication portal between a PC and PDAs or cellular phones utilizing the gigabit Ethernet IP telephone chip 100.

The boot memory block for NAND flash 134 may be adapted to store boot code that controls initialization and setup of the gigabit Ethernet IP telephone chip 100. Other code or parameters may also be stored in the boot memory block for NAND flash 134.

The programmable/watchdog timers block 136 may comprise a plurality of timers such as a watchdog timer. In this regard, a watchdog timer may be included to generate a chip reset if the gigabit Ethernet IP telephone chip 100 is not periodically reset. An interrupt, for example, may be generated after one-half the watchdog count to remind the host to reset the timer.

The Bluetooth interface 120 is Bluetooth compliant and may be coupled to the IrDA encoder/decoder (ENC/DEC) interface block 122. The Bluetooth interface 120 may comprise an UART which may be adapted to support external Bluetooth modules. The Infrared Data Association (IrDA) encoder/decoder block 122 may support serial infrared (SIR) mode of infrared communication.

The enhanced high speed serial (EHSS) port block 118 comprises at least one EHSS interface that is configured to handle serial data. As illustrated in FIG. 1C, the EHSS block 118 may comprise a first EHSS 118*a* and a second EHSS interface 118*b*. The EHSS 118*a* and 118*b* may provide time division multiplexing (TDM) interface for connecting the gigabit Ethernet IP telephone chip 100 with external CODECs or any external device with a synchronous interface.

The UPB bridge block 188 may comprise suitable circuitry, logic, and/or code and may be adapted to bridge the peripheral bus 114 and the system bus 116. Accordingly, the UPB bridge facilitates communication between devices coupled to the system bus 116 and peripheral devices coupled to the peripheral bus 114.

During an exemplary voice data transmission operating cycle, voice data may be acquired via the microphone ports 170*f*, 170*g*, 174*f*, and 174*g* of CODEC blocks 102*a* and 102*b* within the dual CODEC block 102. Voice data may be initially amplified by the on-board amplifiers 170*a* and 174*a*, and then digitized by the ADC blocks 170 and 174 at a high sampling rate, such as 12.5 MHz, for example. The oversampled voice data may be decimated by the CIC (Cascaded-Integrated-Comb) filters within the decimator/equalizer blocks 171 and 175, which may resample the data to an intermediate sampling rate of 100 kHz, for example.

A gain or attenuation may be applied to the resulting 100 kHz sampled signal. The gain-adjusted 100 kHz samples may be further downsampled by an asynchronous sample rate converter (ASRC), not shown in FIG. 1C, to a rate (voice-band) suitable for software digital signal processing, such as 16 kHz. The voiceband samples may be filtered by a programmable equalizer within the decimator/equalizer blocks 171 and 175, which may equalize the transducer response in order to meet telecom specifications. The voice data output of the decimator/equalizer blocks 171 and 175 may be stored in the external SDRAM 154 via the system bus 116 and a DMA control block within the dual CODEC block 102.

The stored voice data may then be communicated to the VPM block 108 for processing. For example, the equalized voice data may be processed by the DSP 180 using voice processing software stack. The software stack within the DSP 180 may perform VoIP processing, such as acoustic echo cancellation, handset echo cancellation, conference bridging, tone generation, comfort noise generation, and/or voice compression. In one embodiment of the invention, the gigabit Ethernet IP telephone chip 100 may utilize the core processor 104 to perform DSP processing functions. In this regard, equalized voice data may be communicated to the core processor 104 for DSP processing.

After equalized voice data is processed by the VPM 108, compressed speech frames may be packetized by the core processor 104. If security is required, packetized voice data may be communicated to the security module 106 for encryption. During encryption, voice data may be communicated from the VPM 108 to the security module 106 via the external SDRAM 154. After encryption, encrypted data packets may be further encapsulated by the core processor 104 with headers suitable for transmission over an IP network.

Encrypted packetized voice data may then be communicated to the multiport Ethernet switch with 802.1p and 802.1Q QoS functionalities 110 via direct memory access using the external SDRAM 154 and the DMA control block within the Ethernet switch 110. The multiport Ethernet switch with 802.1p and 802.1Q QoS functionalities 110 may then route the packetized voice data to a network port, such as port 1, for example. A switch control block (not illustrated in FIG. 1C), for example, may prioritize the packetized voice data by assigning one or more 802.1p priority classes to the data with assigned one or more priority indicators. The prioritized data may be buffered within a high or low priority buffer within the switch 110, prior to transmission outside the switch 110, based on the assigned priority indicators. The packetized voice data may be converted into signals suitable for transmission over an Ethernet cable medium using the internal 10/100Base Ethernet PHY 112*c* or a gigabit Ethernet PHY, not illustrated in FIG. 1C, coupled to the RGMII interface 112*d*. A gigabit Ethernet PHY may be located, for example, off-chip. The 10/100Base PHY or the gigabit PHY may then transmit the packetized voice data via an Ethernet network.

During an exemplary voice data reception operating cycle, packetized voice data may be received by the multiport Ethernet switch with 802.1p and 802.1Q QoS functionalities 110 via an Ethernet cable medium using the internal 10/100Base Ethernet PHY 112*c* or a gigabit Ethernet PHY coupled to the RGMII interface 112d of port 1 of the multiport Ethernet switch with 802.1p and 802.1Q QoS functionalities 110. The multiport Ethernet switch with 802.1p and 802.1Q QoS functionalities 110 may then map one or more user priority indicator of the received data to a low priority class or a high priority class, for example. The prioritized voice data may then be routed internally for processing within the gigabit Ethernet IP telephone chip 100 via port 2. For example, the packetized voice data may be stored in the external DDR SDRAM 154 via the system bus 116 and the DMA control block within the Ethernet switch 110. Prior to routing the prioritized voice data internally for processing within the chip 100, the prioritized data may be buffered in a low priority buffer or a high priority buffer within port 2, based on one or more 802.1p priority tags assigned to the voice data.

The stored packetized voice data may then be communicated to the security module 106 for decryption. Decrypted packetized data may be depacketized by the core processor 104. Depacketized and decrypted voice data may be communicated to the VPM 108 for processing. The VPM 108 may decompress the voice data and may communicate the decompressed voice data to the dual CODEC block 102. The decompressed data may be filtered by the CIC filter 173, or 177 within the CODEC blocks 102a or 102b. Filtered voice data may be converted to an analog signal by the DAC converters 172 or 176, amplified by the amplifiers 170d, 170e, 174d, and 174e, and communicated to one or more of the audio signal outputs 170h, 170i, 174h, and 174i.

During an exemplary network data transmission operating cycle, network data, such as Ethernet data from a PC, may be received by the multiport Ethernet switch with 802.1p and 802.1Q QoS functionalities 110 via an Ethernet cable medium using the internal 10/100Base Ethernet PHY 112a or a gigabit Ethernet PHY coupled to the RGMII interface 112b of port 0 of the multiport Ethernet switch with 802.1p and 802.1Q QoS functionalities 110. In one embodiment of the invention, one of the ports of the multiport Ethernet switch with 802.1p and 802.1Q QoS functionalities 110, such as port 0, may be designated as a PC port and may be utilized during reception and transmission of PC Ethernet data. The 10/100Base Ethernet PHY 112a or the gigabit PHY may convert the PC Ethernet data from analog to digital format. The multiport Ethernet switch with 802.1p and 802.1Q QoS functionalities 110 may then map one or more user priority indicator of the received data to a low priority class or a high priority class, for example. The prioritized data may be routed to a second port, such as port 1. Prioritized Ethernet data may be buffered within a low or high priority buffer at port 1, prior to communicating the data off-chip. For example, the multiport Ethernet switch with 802.1p and 802.1Q QoS functionalities 110 may then route the resulting IP packets to the internal 10/100Base PHY 112c of port 1 or to an external gigabit PHY via the RGMII interface 112d. The 10/100Base PHY 112c or the gigabit PHY may convert the packetized PC Ethernet data into signals suitable for transmission over Ethernet cable medium. In this regard, the signal may flow through the Ethernet cable medium and into an IP network.

During an exemplary network data reception operating cycle, network data, such as Ethernet data for a PC, may be received by the multiport Ethernet switch with 802.1p and 802.1Q QoS functionalities 110 via an Ethernet cable medium using the internal 10/100Base Ethernet PHY 112c or a gigabit Ethernet PHY coupled to the RGMII interface 112d of port 1 of the multiport Ethernet switch with 802.1p and 802.1Q QoS functionalities 110. In one embodiment of the invention, one of the ports of the multiport Ethernet switch with 802.1p and 802.1Q QoS functionalities 110, such as port 0, may be designated as a PC port and may be utilized during reception and transmission of PC Ethernet data. A second port, such as port 1, may be designated as a network port and may be utilized during reception and transmission of packetized data, including voice and network data, from and to an IP network. The 10/100Base Ethernet PHY 112d or the gigabit PHY may convert the network data from analog to digital format. The multiport Ethernet switch with 802.1p and 802.1Q QoS functionalities 110 may then route the resulting IP packets to a second PC data port, such as port 0, for communicating the packetized network data off-chip to a PC. For example, the multiport Ethernet switch with 802.1p and 802.1Q QoS functionalities 110 may route the resulting IP packets to the internal 10/100Base PHY 112a of port 0 or to an external gigabit PHY via the RGMII interface 112b. The 10/100Base PHY 112a or the gigabit PHY may convert the packetized PC Ethernet data into signals suitable for transmission over Ethernet cable medium. In this regard, the signal may flow through the Ethernet cable medium and off-chip to a PC for processing.

Figure 2:
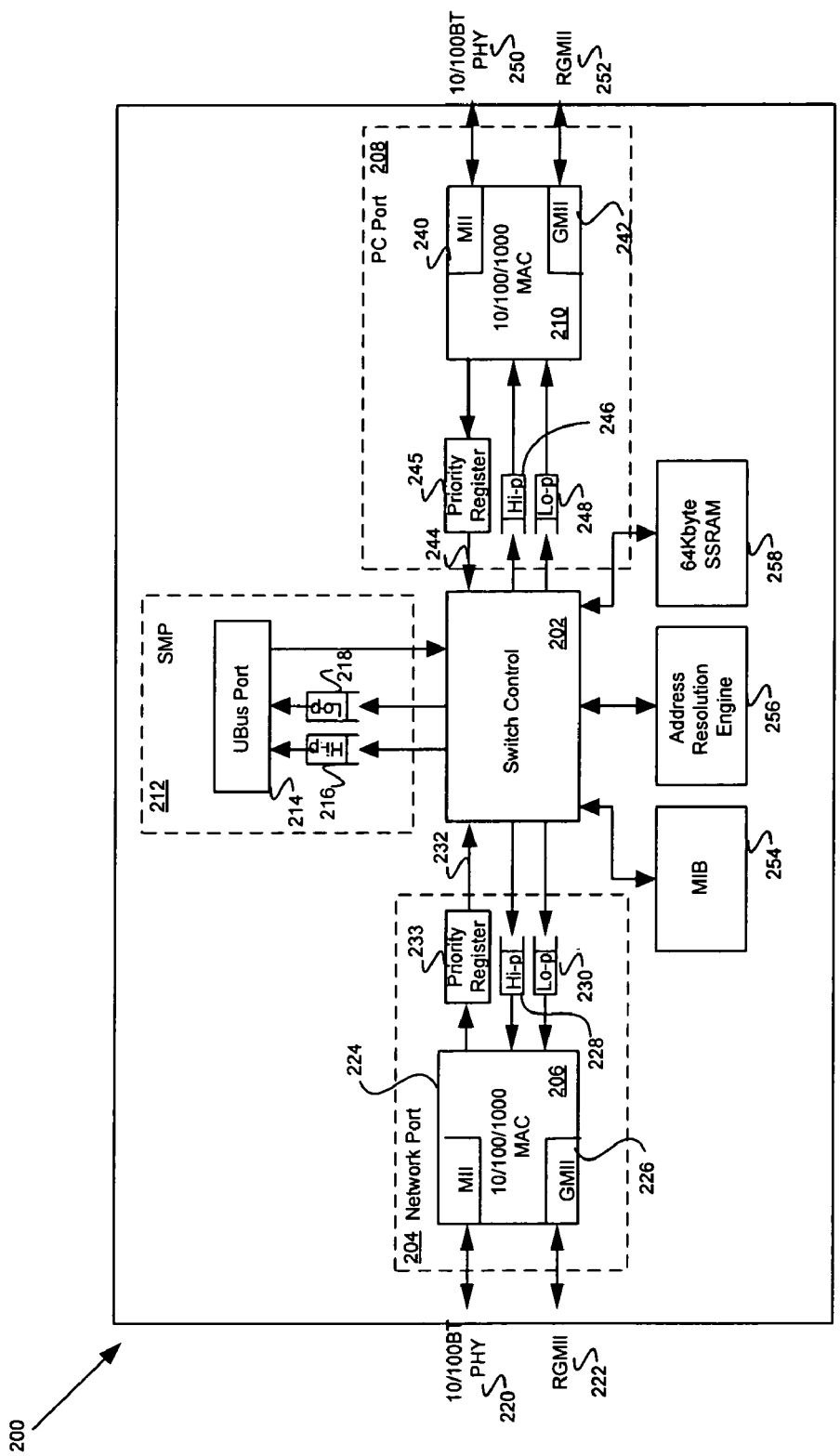
FIG. 2 is a block diagram of an Ethernet switch with 802.1p and 802.1Q QoS functionalities that may be integrated within a gigabit Ethernet IP telephone chip, in accordance with an embodiment of the invention.

FIG. 2 is a block diagram of an Ethernet switch with 802.1p and 802.1Q QoS functionalities that may be integrated within a gigabit Ethernet IP telephone chip, in accordance with an embodiment of the invention. Referring to FIG. 2, the Ethernet switch with 802.1p and 802.1Q QoS functionalities 200 may comprise a switch management port (SMP) 212, a network port 204, a PC port 208, switch control block 202, 10/100Base PHYs 220 and 250, RGMII interfaces 222 and 252, management information base (MIB) statistics registers 254, address resolution engine 256, and memory 258.

The switch 200 may implement an IEEE 802.1p compliant QoS scheme using priority buffers, such as high priority buffers 228, 216, and 246, or low priority buffers 230, 218, and 248. For example, a high priority buffer may be used as a second queue to each port, allowing time-critical packet-like voice data to get preferential treatment over non time-critical regular packets, such as PC data. Packets from the high priority buffers may be sent out before packets from the low priority buffers.

The switch 200 may also comprise a state machine (not illustrated in FIG. 2) for detecting and untagging 802.1p compliant packets. Tagging of priority indicators may be performed by a core processor, for example, and may be implemented by software. Data packets may be tagged with a user-defined priority level indicator, such as an indicator within the range of 0-7, for example. Once the switch 200 obtains the value of a user priority indicator of received data, the switch 200 may map the priority indicator to a priority class. For example, a priority class of 0 may indicate low priority data and a priority class of 1 may indicate high priority data. In this regard, if the user priority class is 1, the current packet may be buffered in a high priority buffer, and if the user priority class is 0, the packet may be buffered in a low priority buffer.

The network port 204 may comprise suitable circuitry, logic, and/or code and may be adapted to route received packetized data, such as network (PC) data or voice data, to the switch control block 202, and route voice or PC data from the switch control block 202 off-chip to an IP network. The network port 204 may comprise 10/100/1000 media access controller (MAC) 206, a high priority buffer 228, a low priority buffer 230, and a priority register 233.

The MAC 206 may comprise suitable circuitry, logic, and/or code and may be adapted to control data flow between the 10/100Base PHY 220 and a gigabit PHY via the RGMII interface 222. In one embodiment of the invention, the MAC 206 may be enabled with triple speed capabilities, as well as half-duplex and full-duplex capabilities. The MAC 206 may provide data flow control in half-duplex mode with backpressure. In full-duplex mode, the MAC 206 may provide IEEE 802.3x frame-based flow control. The MAC 206 may be IEEE 802.3 compliant and may support a frame size of 1536 bytes. The MII 224 may comprise suitable circuitry, logic, and/or code and may be utilized as an interface between the MAC 206 and the 10/100Base PHY 220. The GMII 226 may comprise suitable circuitry, logic, and/or code and may be utilized as an interface between the MAC 206 and the RGMII 222 and a gigabit PHY which may be coupled to the RGMII 222.

The high priority buffer 228 and the low priority buffer 230 may comprise suitable circuitry, logic, and/or code and may be adapted to buffer prioritized data received from the PC port 208 or the SMP 212 prior to communicating the prioritized data outside the network port 204. For example, low priority data may be tagged with a low priority traffic class by the switch control block 202 and may be stored within the low priority buffer 230. Similarly, high priority data may be tagged by the switch control block 202 with a high priority traffic class and may be stored within the high priority buffer 228.

The priority register 233 may comprise suitable circuitry, logic, and/or code and may be utilized to insert, remove or replace one or more 802.1p priority indicators on incoming data received by the network port 204. The 802.1p priority indicators may be set by the switch control block 202 and/or by a core processor, such as the core processor 104 in FIG. 1C. Priority indicator entries may be within the range of 0-7, for example. Other priority indicator ranges may also be utilized and various mapping schemes may also be implemented where a specific priority indicator or a range of priority indicators may correspond to a priority traffic class, such as a high priority class or a low priority class. In one embodiment of the invention, the priority register 233 may store a plurality of old priority indicator entries corresponding to existing priority indicator entries of received data. The priority register 233 may also store a plurality of new priority indicator entries corresponding to each of the old priority indicator entries. In this regard, an old priority indicator entry of received data may be detected by the network port 204 and may be replaced with a corresponding new priority indicator entry from the priority register 233, if the new priority indicator entry is different from the old priority indicator entry.

The PC port 208 may comprise suitable circuitry, logic, and/or code and may be adapted to route received network or PC data to the switch control block 202, and route PC data from the switch control block 202 off-chip to a PC. The PC port 208 may comprise 10/100/1000 media access controller (MAC) 210, a high priority buffer 246, a low priority buffer 248, and a priority register 245.

The MAC 210 may comprise suitable circuitry, logic, and/or code and may be adapted to control PC data flow between the 10/100Base PHY 250 and a gigabit PHY via the RGMII interface 252. Similar to MAC 206, MAC 210 may also be enabled with triple speed capabilities, as well as half- and full-duplex capabilities. The MAC 210 may also provide data flow control in half-duplex mode with backpressure. In full-duplex mode, the MAC 210 may provide IEEE 802.3x frame-based flow control. The MAC 210 may be IEEE 802.3 compliant and may support a frame size of 1536 bytes. The MII 240 may comprise suitable circuitry, logic, and/or code and may be utilized as an interface between the MAC 210 and the 10/100Base PHY 250. The GMII 242 may comprise suitable circuitry, logic, and/or code and may be utilized as an interface between the MAC 210 and the RGMII 252 and a gigabit PHY which may be coupled to the RGMII 252.

The high priority buffer 246 and the low priority buffer 248 may comprise suitable circuitry, logic, and/or code and may be adapted to buffer prioritized data received from the network port 204 or from the SMP 212 prior to communicating the prioritized data outside the PC port 208. For example, low priority data may be tagged by the switch control block 202 with a low priority traffic class, such as 0, and may be stored within the low priority buffer 248. Similarly, high priority data may be tagged by the switch control block 202 with a high priority traffic class, such as 1, and may be stored within the high priority buffer 246.

The priority register 245 may comprise suitable circuitry, logic, and/or code and may be utilized to insert, remove or replace one or more 802.1p priority indicators on incoming data received by the PC port 208. The 802.1p priority indicators may be set by the switch control block 202 and/or by a core processor, such as the core processor 104 in FIG. 1C. In one embodiment of the invention, the priority register 245 may store a plurality of old priority indicator entries corresponding to existing priority indicator entries of received data. The priority register 245 may also store a plurality of new priority indicator entries corresponding to each of the old priority indicator entries. In this regard, an old priority indicator entry of received data may be detected by the PC port 208 and may be replaced with a corresponding new priority indicator entry from the priority register 245.

The SMP 212 may comprise suitable circuitry, logic, and/or code and may be adapted to communicate via the universal bus port 214 packetized data, such as voice data, for on-chip processing by a gigabit Ethernet IP telephone chip, for example, which may be using the multiport Ethernet switch with 802.1p and 802.1Q QoS functionalities 200. Processed voice data may be communicated via the universal bus port 214 within the SMP 212 to the switch control block 202 for routing off-chip via the network port 204, for example.

The SMP 212 may also comprise a high priority buffer 216 and a low priority buffer 218. The high priority buffer 216 and the low priority buffer 218 may comprise suitable circuitry, logic, and/or code and may be adapted to buffer prioritized data received from the network port 204 or from the PC port 208 prior to communicating the prioritized data outside the SMP 212 for processing within a gigabit Ethernet IP telephone chip, for example. Low priority data may be tagged by the switch control block 202 with a low priority class, such as 0, and may be stored within the low priority buffer 218. Similarly, high priority data may be tagged by the switch control block 202 with a high priority class, such as 1, and may be stored within the high priority buffer 216.

The RGMIIs 222 and 252 may comprise suitable circuitry, logic, and/or code and may be adapted to provide an interface between gigabit media independent interfaces (GMIIs) 226 and 242 of the network port 204 and the PC port 208, respectively, and external Ethernet PHYs. In one embodiment of the invention, the multiport Ethernet switch with 802.1p and 802.1Q QoS functionalities 200 may utilize gigabit PHYs for receiving and transmitting of packetized data. The gigabit PHYs may be implemented off-chip or may be integrated within a gigabit Ethernet IP telephone chip, such as the gigabit Ethernet IP telephone chip 100 in FIG. 1C. In this regard, the RGMIIs 222 and 252 may provide an interface between GMIIs 226 and 242 of the multiport Ethernet switch with 802.1p and 802.1Q QoS functionalities 200 and external gigabit PHYs.

The 10/100Base PHYs 220 and 250 may comprise suitable circuitry, logic, and/or code and may be adapted to perform physical layer interface functions for 100BASE-TX full-duplex or half-duplex Ethernet on Category 5 cable, and/or 10BASE-T full-duplex or half-duplex Ethernet on Category 3, 4, or 5 cabling within a gigabit Ethernet IP telephone chip utilizing the multiport Ethernet switch with 802.1p and 802.1Q QoS functionalities 200. For example, the 10/100Base PHYs 220 and 250 may support 4B5B, MLT3, and Manchester encoding and decoding, clock and data recovery, and stream cipher scrambling/descrambling, for example. The 10/100Base PHYs 220 and 250 may also support digital adaptive equalization, line transmission, carrier sense and link integrity monitor, auto-negotiation, and management.

The switch control block 202 may comprise suitable circuitry, logic, and/or code and may be adapted to route packetized data for on-chip or off-chip processing via one or more of the ports 204, 208, and 212. For example, voice and PC data may be received via the network port 204. The received voice data may then be routed for on-chip processing within a gigabit Ethernet IP telephone chip, for example, via the SMP 212. Received PC data may be routed by the switch control block 202 for off-chip processing by a PC via the PC port 208. Voice data processed by the gigabit Ethernet IP telephone chip may be routed by the switch control block 202 from the SMP 212 to the network port 204 where it may be communicated off-chip. Similarly, processed PC data may be routed by the switch control block 202 from the PC port 208 to the network port 204 where it may be communicated off-chip.

In one embodiment of the invention, the multiport Ethernet switch with 802.1p and 802.1Q QoS functionalities 200 may be adapted to support IEEE 802.1p priority and 802.1Q VLAN protocols. In this regard, the multiport Ethernet switch with 802.1p and 802.1Q QbS functionalities 200 may utilize tagging at the network port 204 and the PC port 208 with priority regeneration mapping. In this regard, data received by the multiport Ethernet switch 200 may be tagged with a priority class, such as 0 or 1, for example, corresponding to a user priority indicator assigned to the received data. For example, data with a user priority indicator of 0-3 may be assigned a 0 priority class and may be stored in a low priority buffer. Similarly, data with a user priority indicator of 4-7 may be assigned a 1 priority class and may be stored in a high priority buffer. The prioritized data may be stored within one or more priority queues within the multiport Ethernet switch 200, prior to being communicated outside the switch 200. In this regard, the multiport Ethernet switch with 802.1p and 802.1Q QoS functionalities 200 may maintain, for example, two output port queues for each port.

For example, high priority buffers 228, 216, and 246 may be utilized within the network port 204, the SMP 212, and the PC port 208, respectively, to buffer high priority output data. Similarly, low priority buffers 230, 218, and 248 may be utilized within the network port 204, the SMP 212, and the PC port 208, respectively, to buffer low priority output data. In this regard, traffic priority within the multiport Ethernet switch with 802.1p and 802.1Q QoS functionalities 200 may be mapped onto one of two traffic classes, 0 or 1, for example. Outgoing traffic class 1 packets may be enqueued onto the high priority buffers 228, 216, and 246. The high priority buffers 228, 216, and 246 may be adapted to accommodate 2 packets, for example, and overflow packets from the high priority buffers 228, 216, and 246 may be discarded. In another aspect of the invention, the high priority queue depth may be programmable and any overflow packets may be enqueued onto the low priority buffers 230, 218, and 248.

In another embodiment of the invention, each of the high priority buffers 228, 216, and 246 and the low priority buffers 230, 218, and 248 may be utilized to buffer voice and/or PC data. In this regard, both voice and PC data may be prioritized by the multiport switch 200 prior to communicating the data for on-chip or off-chip processing. The multiport switch 200 may be also adapted to replace one or more existing 802.1p priority indicators on voice and/or PC data received by one or more ports within the multiport switch 200. Furthermore, the multiport switch 200 may utilize 802.1Q virtual LAN (VLAN) functionalities for partitioning one or more of the switching ports 204, 208, and/or 212 into private domains. In this regard, data may be communicated and switched via selected private domains of one or more switching ports, which increases security of data processing within the gigabit Ethernet IP telephone chip integrating the multiport switch 200 with 802.1p and 802.1Q QoS functionalities.

The multiport Ethernet switch with 802.1p and 802.1Q QoS functionalities 200 may also support source MAC address filtering for the PC port 208, port mirroring, port isolation, multi-port forwarding, and status change interrupt. In addition, the multiport Ethernet switch with 802.1p and 802.1Q QoS functionalities 200 may support LED interface, which may provide visibility per port of link status, combined transmit and receive activity, duplex mode, and port speed.

The address resolution engine 256 may comprise suitable circuitry, logic, and/or code and may be adapted to provide address learning and recognition functions to the switch control block 202 at high frame rates. The address resolution engine 256 may utilize an address table, which may hold 1K unicast addresses, for example. Addresses may be added to the table after receiving a data packet. In this regard, broadcast and multicast frames may be forwarded to one or more ports, except the port where it was received.

The MIB statistics registers 254 may comprise suitable circuitry, logic, and/or code and may be utilized to collect, receive and transmit statistics for each port. In addition, the MIB registers 254 may be utilized to provide direct hardware support for EtherLike MIB, Bridge MIB, MIB II (Interfaces), and the first four groups of the remote network monitoring (RMON) MIB. At least a portion of the standardized RMON groups may be supported by using additional capabilities, such as port mirroring/snooping, together with an external microcontroller to process some MIB attributes. The MIB registers 254 may be accessed through a Serial Management Port, for example, by an external microcontroller or processor.

In one embodiment of the invention, the switch 200 may utilize a 2-queue scheduling algorithm for 802.1p priority tagged data, which may be stored in high priority buffers 228, 216, and 246, or low priority buffers 230, 218, and 248. The scheduling algorithm may allow a certain number of packets in regular queue to leak out when constant high queue packets flow through the switch 200. The leakage amount may be defined by priority scheduling weight coefficient bits in the priority register 233 or 245, for example. In this regard, when high priority queue (HPQ) packets are present, the priority scheduling weight coefficient bits may define the number of HPQ packets that may be transmitted before low priority packets are allowed to transmit. High priority buffer depth may be programmable from 1 to 31, for example. If the number of packets in the high priority buffer is equal to this threshold, further incoming high priority packets may be dropped.

During an exemplary voice data transmission operating cycle encrypted packetized voice data may be received by the SMP 212 via the universal bus port 214 and may be communicated to the switch control block 202 for routing. The SMP 212 may prioritize the voice data by assigning one or more priority classes corresponding to a user priority indicator of the received voice data. A high priority class and/or a low priority class, for example, may be utilized. The switch control block 202 may then route the prioritized voice data to the network port 204. High priority voice data may then be buffered by the high priority buffer 228 and low priority voice data may be buffered by the low priority buffer 230. Packetized voice data from both buffers 228 and 230 may be communicated to the MAC 206. The MAC 206 may communicate the voice data to the 10/100Base Ethernet PHY 220 or to the RGMII interface 222 for communication to a gigabit Ethernet PHY. In this regard, the voice data may be converted into signal suitable for transmission over an Ethernet cable medium using the internal 10/100Base Ethernet PHY 220 or a gigabit Ethernet PHY, not illustrated in FIG. 2, coupled to the RGMII interface 222. A gigabit Ethernet PHY may be located, for example, off-chip. The 10/100Base PHY 220 or the gigabit PHY may then transmit the packetized voice data via an Ethernet network.

During an exemplary voice data reception operating cycle, packetized voice data may be received by the multiport Ethernet switch with 802.1p and 802.1Q QoS functionalities 200 via an Ethernet cable medium using the internal 10/100Base Ethernet PHY 220. Packetized voice data may also be received by the multiport Ethernet switch with 802.1p and 802.1Q QoS functionalities 200 via a gigabit Ethernet PHY coupled to the RGMII interface 222 of the network port 204 of the multiport Ethernet switch with 802.1p and 802.1Q QoS functionalities 200. The received voice data may then be communicated to the MAC 206 and, via connection 232, to the switch control block 202. The network port 204 may prioritize the received voice data by assigning one or more priority classes corresponding to a user priority indicator of the received voice data. A high priority class and/or a low priority class, for example, may be utilized. An existing user priority indicator may also be replaced utilizing priority indicators stored in the priority register 233. The network port 204 may then route the prioritized voice data to the switch control block 202. The switch control block 202 may route the prioritized voice data to the SMP 212. High priority voice data may then be buffered by the high priority buffer 216 and low priority voice data may be buffered by the low priority buffer 218 within the SMP 212. The multiport Ethernet switch with 802.1p and 802.1Q QoS functionalities 200 may then route the packetized voice data internally for processing within the gigabit Ethernet IP telephone chip via the universal bus port 214.

During an exemplary network or PC data transmission operating cycle, PC data may be communicated from a PC and may be received by the multiport Ethernet switch with 802.1p and 802.1Q QoS functionalities 200. PC data may be received via an Ethernet cable medium using the internal 10/100Base Ethernet PHY 250 or a gigabit Ethernet PHY coupled to the RGMII interface 252 of the PC port 208. The PC port 208 may prioritize the PC data by assigning one or more priority classes corresponding to a user priority indicator of the received PC data. A high priority class and/or a low priority class, for example, may be utilized. An existing user priority indicator may also be replaced utilizing priority indicators stored in the priority register 245. The PC port 208 may then route the prioritized PC data to the switch control block 202. The switch control block 202 may route the received PC data to the network port 204 for communicating the PC data off-chip. High priority PC data may then be buffered by the high priority buffer 228 and low priority voice data may be buffered by the low priority buffer 230.Received PC data may be prioritized and high priority data may buffered by the high priority buffer 228 and low priority data may be buffered by the low priority buffer 230. The multiport Ethernet switch with 802.1p and 802.1Q QoS functionalities 200 may then route the packetized voice data internally for processing within the gigabit Ethernet IP telephone chip via the universal bus port 214.

During an exemplary network or PC data reception operating cycle, PC data may be communicated from an IP network and may be received by the multiport Ethernet switch with 802.1p and 802.1Q QoS functionalities 200. PC data may be received via an Ethernet cable medium using the internal 10/100Base Ethernet PHY 220 or a gigabit Ethernet PHY coupled to the RGMII interface 222 of the network port 204. The received PC data may then be communicated to the MAC 206 and, via connection 232, to the switch control block 202. The network port 204 may prioritize the received PC data by assigning one or more priority classes corresponding to a user priority indicator of the received voice data. A high priority class and/or a low priority class, for example, may be utilized. An existing user priority indicator may also be replaced utilizing priority indicators stored in the priority register 233. The switch control block 202 may route the received prioritized PC data to the PC port 208 for communicating the PC data off-chip to a PC. High priority PC data may buffered by the high priority buffer 246 and low priority PC data may be buffered by the low priority buffer 248 within the PC port 208. The multiport Ethernet switch with 802.1p and 802.1Q QoS functionalities 200 may then route the PC data off-chip for processing by a PC, for example. In this regard, the PC data may be converted into signals suitable for transmission over an Ethernet cable medium using the internal 10/100Base Ethernet PHY 250 or a gigabit Ethernet PHY, not illustrated in FIG. 2, coupled to the RGMII interface 252. A gigabit Ethernet PHY may be located, for example, off-chip. The 10/100Base PHY 250 or the gigabit PHY may then transmit the PC data via an Ethernet network to a PC for further processing.

In one embodiment of the invention, the high priority and the low priority buffers, as well as the priority registers 233 and 245 within the multiport Ethernet switch 200 may be programmable with varying depth to accommodate different processing speeds.

Figure 3:
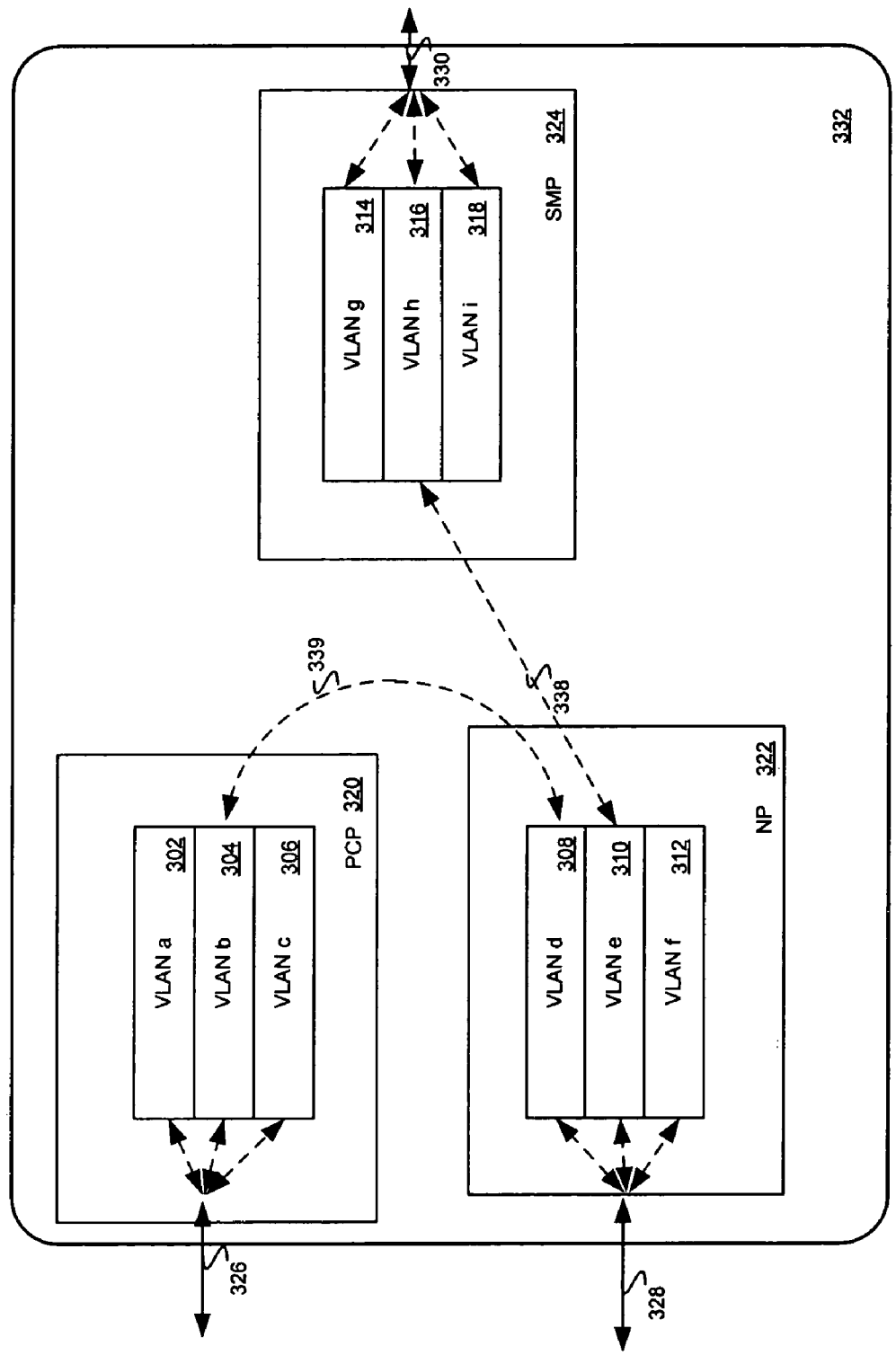
FIG. 3 is a block diagram of an Ethernet multiport switch with 802.1p and 802.1Q QoS functionalities utilizing virtual local area network (VLAN) domains, in accordance with an embodiment of the invention.

FIG. 3 is a block diagram of an Ethernet multiport switch with 802.1p and 802.1Q QoS functionalities utilizing virtual local area network (VLAN) domains, in accordance with an embodiment of the invention. Referring to FIG. 3, the Ethernet multiport switch 332 with 802.1p and 802.1Q QoS functionalities may comprise a switch management port (SMP) 324, a network port 322, and a PC port 320.

The network port 322 may comprise suitable circuitry, logic, and/or code and may be adapted to route received packetized data via connection 328, such as network (PC) data or voice data, to the switch management port 324 or the PC port 320. For example, PC data may be routed to the PC port 320 and then off-chip to a PC via connection 326. Voice data may be routed to the SMP 324 and then for on-chip processing within a gigabit Ethernet IP telephone chip, for example, via connection 330.

The PC port 320 may comprise suitable circuitry, logic, and/or code and may be adapted to route received network or PC data to the network port 322 for communication outside the switch 332 via connection 328, and route PC data from the network port 322 off-chip to a PC. The SMP 324 may comprise suitable circuitry, logic, and/or code and may be adapted to communicate via connection 330, packetized data, such as voice data, for on-chip processing by a gigabit Ethernet IP telephone chip, for example. Processed voice data may be communicated via the connection 330 to the SMP 324 for routing off-chip via the network port 322, for example.

In one embodiment of the invention, the Ethernet multiport switch 332 may utilize 802.1Q functionality by partitioning the switching ports 320, 322 and 324 into separate private domains. For example, the network port 322 may be partitioned into virtual LAN (VLAN) domains 308, ..., 312, the PC port 320 may be partitioned into VLAN domains 302, ..., 306, and the SMP 324 may be partitioned into VLAN domains 314, ..., 318. In this regard, data received by any of the three ports 320, ..., 324 may be assigned a VLAN port domain identification (ID) and data may be switched only between VLAN port domains with matching IDs, thereby increasing security of data processing within the Ethernet multiport switch 332.

During an exemplary voice data reception cycle, voice data may be received by the network port 322 via connection 328 and may be assigned a VLAN port domain 310. VLAN port domain 310 may have a domain ID corresponding to VLAN port domain 316 within the SMP 324. Voice data may then be securely communicated from VLAN port domain 310 within the network port 322 to VLAN port domain 316 within SMP 324 via connection 338.

Similarly, during an exemplary PC data reception cycle, PC data may be received by the network port 322 via connection 328 and may be assigned a VLAN port domain 308. VLAN port domain 308 may have a domain ID corresponding to VLAN port domain 304 within the PC port 320. PC data may then be securely communicated from VLAN port domain 308 within the network port 322 to VLAN port domain 304 within the PC port 320 via connection 339.

Even though each port 320, 322, and 324 within the Ethernet multiport switch 332 is partitioned into three port domains, the present invention may not be so limited. Therefore, in other embodiments of the invention, a different number of port domains may be utilized for each of the switching ports 320, 322, and 324 within the Ethernet multiport switch 332 with 802.1p and 802.1Q QoS functionalities.

In one embodiment of the invention, each port 320, 322, and 324 within the Ethernet multiport switch 332 may utilize an 802.1Q VLAN control register and a configuration register. A single bit in the control register may be utilized to enable 802.1pQ, 802.1p priority retagging, and 802.1Q VLAN features. In addition, a single bit in the control register may be utilized when ingress frames are forwarded to ports with a matching VLAN ID. One bit in the control register may be utilized to forward GARP (Generic Attribute Registration Protocol) Multicast Registration Protocol (GMRP) frames to the SMP 324. Another bit in the control register may be utilized to forward GARP VLAN Registration Protocol (GVRP) frames to the SMP 324.

One bit in the configuration register may be utilized to discard ingress frames that are not VLAN-tagged. One bit in the configuration register may be utilized to discard ingress frames with a VLAN ID that does not match the VLAN ID configured for the ingress port. One bit in the configuration register may be utilized to handle egress of non-tagged frames. One bit in the configuration register may be utilized to handle ingress frames that are priority-tagged or VLAN-tagged, as well as to have the tag replaced with the VLAN ID and priority configured for the ingress port. One bit in the configuration register may be utilized to handle ingress frames that are untagged or priority-tagged, and to have a tag added using the VLAN ID and priority configured for the ingress port. One bit in the configuration register may be utilized to remove tags from tagged frames that have been forwarded for egress. One bit in the configuration register may be utilized to forward ingress frames that are tagged with any VLAN ID for egress. Three bits in the configuration register may be utilized to set priority level associated with the port, and 12 bits may be utilized for a default VLAN ID associated with a corresponding port.

Figure 4:
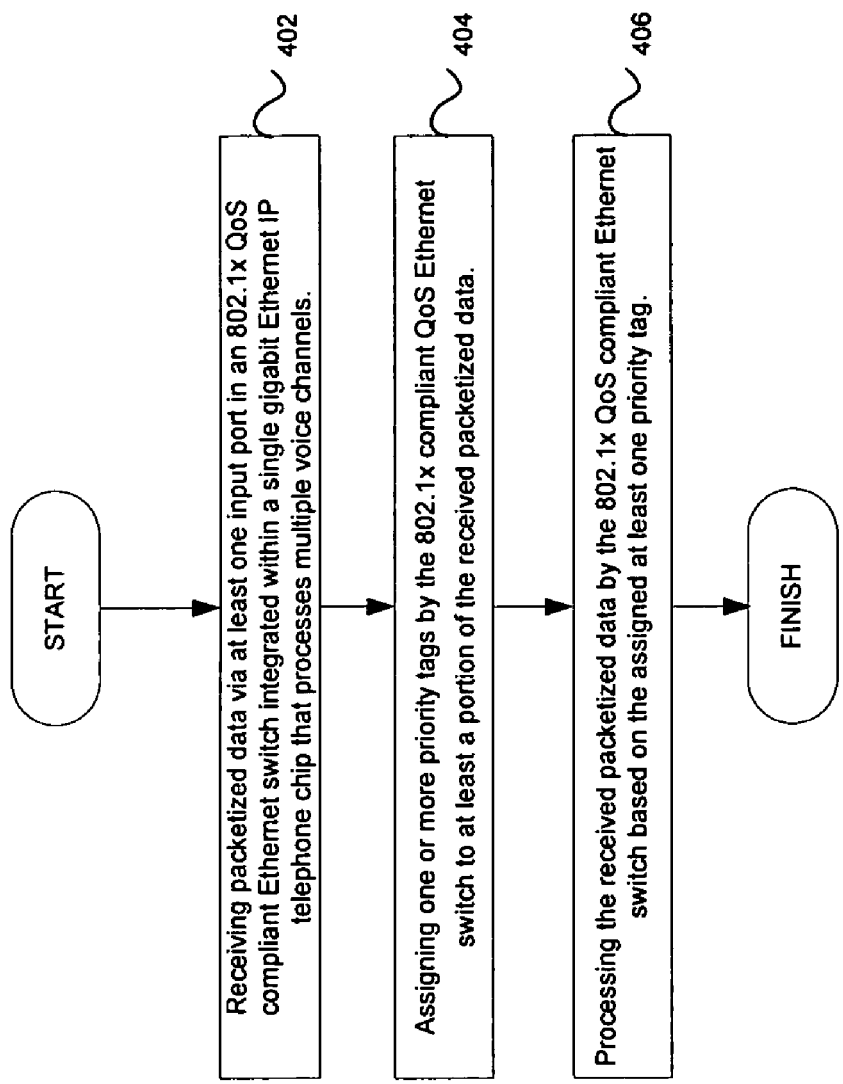
FIG. 4 is a flow diagram illustrating exemplary steps for processing Ethernet data, in accordance with an embodiment of the invention.

FIG. 4 is a flow diagram illustrating exemplary steps for processing Ethernet data, in accordance with an embodiment of the invention. Referring to FIG. 4, at 402, packetized data may be received via at least one input port in an 802.1p and 802.1Q QoS functionalities compliant Ethernet switch integrated within a single gigabit Ethernet IP telephone chip that processes multiple voice channels. At 404, one or more priority tags may be assigned by the 802.1p and 802.1Q QoS functionalities compliant Ethernet switch to at least a portion of the received packetized data. At 406, the received packetized data may be processed by the 802.1p and 802.1Q QoS functionalities compliant Ethernet switch based on the assigned at least one priority tag.

Referring again to FIG. 2, in one embodiment of the invention, a system for processing data may comprise an 802.1p and 802.1Q QoS functionalities compliant Ethernet switch with 802.1p and 802.1Q QoS functionalities 200 which may be integrated within a single gigabit Ethernet IP telephone chip that processes multiple voice channels. The 802.1p and 802.1Q QoS compliant Ethernet switch with 802.1p and 802.1Q QoS functionalities 200 may be adapted to receive packetized data via at least one input port, such as the network port 204 or the PC port 208. The 802.1p and 802.1Q QoS compliant Ethernet switch with 802.1p and 802.1Q QoS functionalities 200 may assign one or more priority tags to at least a portion of the received packetized data via the input ports 204 and 208. Received packetized data may comprise voice data, received via input port 204, and network data or PC data, received via input port 208. The 802.1p and 802.1Q QoS compliant Ethernet switch with 802.1p and 802.1Q QoS functionalities 200 may process the received packetized data based on the assigned priority tag. A priority tag may comprise a high priority tag or a low priority tag.

The network port 204, the PC port 208 and the switch management port (SMP) 212 within the 802.1p and 802.1Q QoS compliant Ethernet switch with 802.1p and 802.1Q QoS functionalities 200 may each comprise a high priority buffer, such as buffers 228, 246, and 216, and low priority buffers, such as buffers 230, 248, and 218. The high priority buffers 228, 246, and 216 may be utilized within the 802.1p and 802.1Q QoS compliant Ethernet switch with 802.1p and 802.1Q QoS functionalities 200 to buffers at least a portion of the received packetized data, if a corresponding priority tag comprises a high priority tag. Similarly, the low priority buffers 230, 248, and 218 may be utilized within the 802.1p and 802.1Q QoS compliant Ethernet switch with 802.1p and 802.1Q QoS functionalities 200 to buffers at least a portion of the received packetized data, if a corresponding priority tag comprises a low priority tag. The 802.1p and 802.1Q QoS compliant Ethernet switch with 802.1p and 802.1Q QoS functionalities 200 may buffer at least a portion of the received packetized data in a low priority buffer and/or in a high priority buffer, associated with one or more of the ports 204, 208 and 212 of the 802.1p and 802.1Q QoS compliant Ethernet switch with 802.1p and 802.1Q QoS functionalities 200.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing data, the method comprising:
receiving packetized data via at least one of a plurality of input ports in an Ethernet switch, wherein each of said plurality of input ports is partitioned into a plurality of virtual local area network (VLAN) port domains with an assigned port domain identification (ID) for processing 802.1 Class of Service (CoS) priority and Quality of Service (QoS) packetized data, wherein said Ethernet switch is integrated within a single gigabit Ethernet IP telephone chip that processes multiple voice channels, said received packetized data having assigned at least one priority class;
assigning at least another priority class to said received packetized data, by retagging said received packetized data utilizing at least another priority tag; and
processing said received packetized data by said Ethernet switch based on said assigned at least another priority class.

2. The method according to claim 1, wherein said at least one priority class comprises one or both of a high priority class and/or a low priority class.

3. The method according to claim 1, comprising, if said at least one priority class comprises a high priority class, buffering said received packetized data in a high priority buffer integrated within said Ethernet switch.

4. The method according to claim 1, comprising, if said at least one priority class comprises a low priority class, buffering said received packetized data in a low priority buffer integrated within said Ethernet switch.

5. The method according to claim 1, comprising buffering at least a first portion of said received packetized data in at least one high priority buffer associated with said at least one of said plurality of input ports of said Ethernet switch.

6. The method according to claim 1, comprising buffering at least a second portion of said received packetized data in at least one low priority buffer associated with said at least one of said plurality of input ports of said Ethernet switch.

7. The method according to claim 1, comprising buffering at least a portion of said received packetized data in one or both of a low priority buffer and/or a high priority buffer, said low and high priority buffers associated with at least one output port of said Ethernet switch.

8. The method according to claim 1, comprising partitioning at least a portion of input ports of said Ethernet switch into a first plurality of virtual private domains, wherein each of said first plurality of virtual private domains comprises an input port domain identification (ID).

9. The method according to claim 8, comprising partitioning at least a portion of output ports of said Ethernet switch into a second plurality of virtual private domains, wherein each of said second plurality of virtual private domains comprises an output port domain identification (ID).

10. The method according to claim 9, comprising switching via said Ethernet switch, at least a portion of said received packetized data between a first virtual private domain of at least one of said partitioned at least said portion of said input ports and a second virtual private domain of at least one of said partitioned at least said portion of said output ports, wherein said input port domain ID of said first virtual private domain equals said output port domain ID of said second virtual private domain.

11. The method according to claim 1, comprising assigning said at least one priority class by said Ethernet switch to said received packetized data, based on at least one priority indicator assigned to said received packetized data.

12. The method according to claim 1, comprising utilizing one or more bits in a plurality of registers in said Ethernet switch.

13. The method according to claim 12, wherein said plurality of registers comprises a VLAN control register.

14. The method according to claim 12, wherein said plurality of registers comprises a configuration register.

15. The method according to claim 12, comprising utilizing said one or more bits in said plurality of registers for handling ingressing and egressing frames in said portion of said received packetized data.

16. The method according to claim 12, comprising utilizing said one or more bits in said plurality of registers for assigning said at least one priority class associated with a corresponding forwarding port in said Ethernet switch.

17. The method according to claim 1, wherein said processing of said received packetized data by said Ethernet switch comprises matching said assigned port domain ID with at least another one of said partitioned VLAN port domain IDs on said Ethernet switch.

18. A system for processing data, the system comprising:
an Ethernet switch comprising a plurality of ports, wherein each of said plurality of ports is partitioned into a plurality of VLAN port domains with an assigned port domain identification (ID) for processing 802.1 Class of Service (CoS) priority and Quality of Service (QoS) packetized data, wherein said Ethernet switch is integrated within a single gigabit Ethernet IP telephone chip that is operable to process multiple voice channels, and wherein said Ethernet switch is operable to receive packetized data via one or more of said plurality of VLAN port domains in one or more of said plurality of ports, said received packetized data having assigned at least one priority class;

said Ethernet switch is operable to assign at least another priority class to said received packetized data, by retagging said received packetized data utilizing at least another priority tag; and said Ethernet switch is operable to process said received packetized data based on said assigned at least another priority class.

19. The system according to claim 18, wherein said at least one priority class comprises one or both of a high priority class and/or a low priority class.

20. The system according to claim 18, comprising a high priority buffer integrated within said Ethernet switch, said high priority buffer is operable to buffer said received packetized data, if said at least one priority class comprises a high priority class.

21. The system according to claim 18, comprising a low priority buffer integrated within said Ethernet switch, said low priority buffer is operable to buffer said received packetized data, if said at least one priority class comprises a low priority class.

22. The system according to claim 18, comprising at least one high priority buffer associated with one or more of said plurality of VLAN port domains in one or more of said plurality of ports of said Ethernet switch that is operable to buffer at least a first portion of said received packetized data.

23. The system according to claim 18, comprising at least one low priority buffer associated with one or more of said plurality of VLAN port domains in one or more of said plurality of ports of said Ethernet switch, said at least one low priority buffer is operable to buffer at least a second portion of said received packetized data.

24. The system according to claim 18, wherein said Ethernet switch is operable to buffer at least a portion of said received packetized data in one or both of a low priority buffer and/or a high priority buffer, said low and high priority buffers associated with at least another one of said VLAN port domain of said Ethernet switch.

25. The system according to claim 18, wherein said Ethernet switch is operable to partition at least a portion of input ports of said Ethernet switch into a first plurality of virtual private domains, wherein each of said first plurality of virtual private domains comprises an input port domain identification (ID).

26. The system according to claim 25, wherein said Ethernet switch is operable to partition at least a portion of output ports of said Ethernet switch into a second plurality of virtual private domains, wherein each of said second plurality of virtual private domains comprises an output port domain identification (ID).

27. The system according to claim 26, wherein said Ethernet switch is operable to switch at least a portion of said received packetized data between a first virtual private domain of at least one of said partitioned at least said portion of said input ports and a second virtual private domain of at least one of said partitioned at least said portion of said output ports, and wherein said input port domain ID of said first virtual private domain equals said output port domain ID of said second virtual private domain.

28. The system according to claim 18, wherein said Ethernet switch is operable to assign said at least one priority class to said received packetized data, based on at least one priority indicator assigned to said received packetized data.

29. The method according to claim 18, comprising utilizing one or more bits in a plurality of registers in said Ethernet switch.

30. The method according to claim 29, wherein said plurality of registers comprises a VLAN control register.

31. The method according to claim 29, wherein said plurality of registers comprises a configuration register.

32. The method according to claim 29, comprising utilizing said one or more bits in said plurality of registers for handling ingressing and egressing frames in said portion of said received packetized data.

33. The method according to claim 29, comprising utilizing said one or more bits in said plurality of registers for assigning said at least one priority class associated with a corresponding forwarding port in said Ethernet switch.

34. The system according to claim 18, wherein said Ethernet switch is operable to process said received packetized data based on matching said assigned port domain ID with at least another one of said partitioned VLAN port domain IDs on said Ethernet switch.

* * * * *

UNITED STATES PATENT AND TRADEMARK OFFICE
CERTIFICATE OF CORRECTION

| | | |
|---|---|---|
| PATENT NO. | : 7,864,681 B2 | Page 1 of 1 |
| APPLICATION NO. | : 11/151135 | |
| DATED | : January 4, 2011 | |
| INVENTOR(S) | : Shore et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1194 days.

Signed and Sealed this
Eleventh Day of October, 2011

David J. Kappos
*Director of the United States Patent and Trademark Office*